(No Model.)
D. WILKIE & G. A. DUGGAN.
MILK CAN.
No. 287,205.        Patented Oct. 23, 1883.
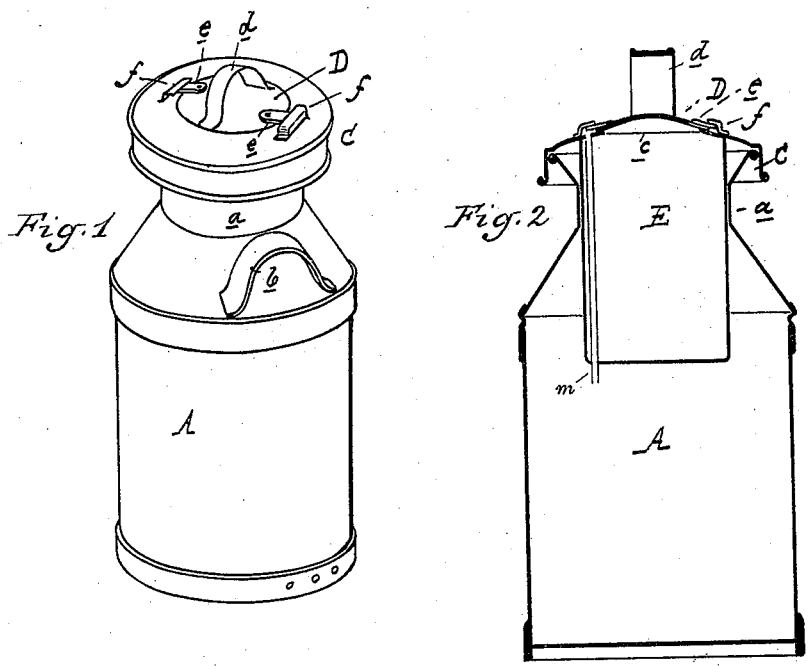
Attest:
A. Barthel
E. Scully
Inventors:
David Wilkie & Geo. A. Duggan
by their Att'y

United States Patent Office.

DAVID WILKIE AND GEORGE A. DUGGAN, OF DETROIT, MICHIGAN.

MILK-CAN.

SPECIFICATION forming part of Letters Patent No. 287,205, dated October 23, 1883.

Application filed February 23, 1883. (No model.)

*To all whom it may concern:*

Be it known that we, DAVID WILKIE and GEORGE A. DUGGAN, of Detroit, in the county of Wayne and State of Michigan, have invented new and useful Improvements in Milk-Cans; and we hereby declare that the following is a full, clear, and exact description thereof, reference being had to the accompanying drawings, which form a part of this specification.

This invention relates to certain new and useful improvements in the construction of milk-cans such as are usually employed by dealers in milk. Such dealers frequently meet with serious loss, especially in warm and humid weather, by the milk souring, and this souring usually commences at the top, and frequently it is found that the larger bulk of the milk toward the bottom of the can is sweet.

The object of this invention is to construct a can that, when used as hereinafter described, will preserve the milk in a cool and sweet condition, thereby rendering it safe to transport such milk longer distances, and to keep the same a longer time than can be done with the appliances in ordinary use for those purposes.

Figure 1 is a perspective of our improved milk-can, and Fig. 2 is a vertical central section of the same.

In the accompanying drawings, A represents a can of the ordinary construction, provided with the neck $a$ and handles $b$. C is the cover thereto, provided with a central orifice, $c$, in the top thereof, to which is fitted a cover, D, provided with a handle, $d$, and on opposite sides this cover is provided with lugs $e$, designed to engage with stops $f$, secured at each side of the orifice in the cover C. Secured to the under side of this cover C, so as to form an integral part thereof, is formed the chamber E, with a tight bottom, and the wall of this chamber is designed to closely fit within the neck of the can when the cover is in place.

By making the ice-vessel to fit the inside of the can it serves the purpose of a stopper, and no fastening is required to hold the cover proper in place, and, moreover, it enables larger pieces and more ice to be used than when a small ice-receptacle is employed.

When this device is in use, the chamber E is filled with ice, and its cover D secured in place by locking the lugs and stops together, which is done by a partial rotation of such cover. The chamber, projecting partially down within the can, will continually keep the milk in the top thereof cool and sweet, and thereby preserve the contents of the can. The entire cover and chamber may at any time be removed by lifting upon the handle $d$ of the cover D to the orifice in the cover proper.

It is better that the milk in the can should be supplied with a little fresh air. In order to do this, we insert a small tube, $m$, vertically through the chamber, opening at top through the cover proper, and at its lower end through the bottom of the chamber. By this means air is admitted at a proper temperature, being cooled in its passage through the tube by the ice in the chamber.

It is evident that this invention may be applied to water-coolers, in which case the quite impure and dirty ice may be used to cool the water to a pleasant drinking temperature without impregnating the same by the ice melting therein.

We are aware of Patent No. 274,485, of 1883, and we are also aware that it is not new with us to provide milk-can covers with ice-chambers, and such constructions are not sought to be covered in this application.

What we do claim is—

The milk-can herein described, consisting of the can A, the cover C, having downwardly-projecting annular flange, which fits over the flaring rim of the can A, and having, also, ice-chamber E and stops $f$, and the auxiliary cover D, having lugs $e$, said auxiliary cover being adapted to close the ice-chamber when the parts $e$ and $f$ are engaged, the whole combined and operating as set forth.

DAVID WILKIE.
GEORGE A. DUGGAN.

Witnesses:
H. S. SPRAGUE,
E. W. ANDREWS.